(12) United States Patent
Kato et al.

(10) Patent No.: US 10,814,266 B2
(45) Date of Patent: Oct. 27, 2020

(54) HONEYCOMB FILTER

(71) Applicant: NGK INSULATORS, LTD., Nagoya (JP)

(72) Inventors: Yasushi Kato, Nagoya (JP); Takahiro Kondo, Nagoya (JP); Junki Matsuya, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 144 days.

(21) Appl. No.: 16/178,912

(22) Filed: Nov. 2, 2018

(65) Prior Publication Data

US 2019/0160413 A1 May 30, 2019

(30) Foreign Application Priority Data

Nov. 24, 2017 (JP) ................. 2017-225576
Oct. 17, 2018 (JP) ................. 2018-196100

(51) Int. Cl.
*B01D 46/00* (2006.01)
*F01N 3/02* (2006.01)
*B01D 46/24* (2006.01)
*F01N 3/022* (2006.01)

(52) U.S. Cl.
CPC ......... *B01D 46/2429* (2013.01); *B01D 46/00* (2013.01); *B01D 46/247* (2013.01); *B01D 46/2474* (2013.01); *F01N 3/022* (2013.01); *B01D 2046/2433* (2013.01); *B01D 2046/2481* (2013.01); *B01D 2046/2485* (2013.01); *B01D 2046/2492* (2013.01); *B01D 2046/2496* (2013.01); *B01D 2279/30* (2013.01)

(58) Field of Classification Search
CPC ............ F01N 3/02; F01N 3/022; B01D 46/00
USPC ............................................. 55/523, DIG. 30
See application file for complete search history.

(56) References Cited

U.S. PATENT DOCUMENTS

| 7,393,377 | B2 * | 7/2008 | Kasai ................. | B01D 39/2068 428/116 |
| 7,468,202 | B2 * | 12/2008 | Sakamoto .......... | B01D 39/2068 428/116 |
| 2005/0191461 | A1 | 9/2005 | Kasai et al. | |
| 2009/0297766 | A1 | 12/2009 | Furuta | |

FOREIGN PATENT DOCUMENTS

| JP | 2003269131 A * | 9/2003 | ............... F01N 3/02 |
| JP | 2005-270969 A1 | 10/2005 | |
| JP | 2010-221159 A1 | 10/2010 | |
| WO | 2008/117559 A1 | 10/2008 | |

\* cited by examiner

*Primary Examiner* — Robert A Hopkins
(74) *Attorney, Agent, or Firm* — Burr & Brown, PLLC

(57) ABSTRACT

A honeycomb filter includes a honeycomb structure body having porous partition walls arranged to surround cells, in a cross section of the honeycomb structure body which is perpendicular to an extending direction of the cells, a value of a porosity of the partition wall in a partitioning region between the inflow cell and the outflow cell is defined as a porosity A, among intersecting portions where partitioning regions of the partition walls between the cells intersect one another, a value of a porosity of the partition wall in an intersecting portion between the two inflow cells is defined as a porosity B, and a value of A/B obtained by dividing the porosity A by the porosity B is from 0.50 to 0.95.

7 Claims, 7 Drawing Sheets

HONEYCOMB FILTER

The present application is an applications based on JP2017-225576 filed on Nov. 24, 2017 and JP2018-196100 filed on Oct. 17, 2018 with Japan Patent Office, the entire contents of which are incorporated herein by reference.

BACKGROUND OF THE INVENTION

Field of the Invention

The present invention relates to a honeycomb filter, and more particularly, it relates to a honeycomb filter which has an excellent thermal shock resistance and is capable of effectively inhibiting particulate matter such as soot from leaking outside.

Description of the Related Art

In various industries, internal combustion engines have been used as power sources. On the other hand, exhaust gases emitted from the internal combustion engines during combustion of fuel include particulate matter such as soot or ash. For example, regulations on removal of the particulate matter to be emitted from a diesel engine have become stricter worldwide, and as a filter to remove the particulate matter, a honeycomb filter having a honeycomb structure is used. Hereinafter, the particulate matter may be referred to as "PM". The PM is an abbreviation for "the particulate matter".

Heretofore, as the honeycomb filter to remove the PM, there has been suggested a honeycomb filter including a honeycomb structure body having porous partition walls defining a plurality of cells, and a plugging portion to plug either one of end portions of each of the cells (e.g., see Patent Documents 1 to 3).

Such a honeycomb filter has a structure in which the porous partition walls perform a function of a filter which removes the PM. Specifically, when an exhaust gas containing the PM flows into an inflow end face of the honeycomb filter, the PM is trapped by the porous partition walls to filter the exhaust gas, and then the purified exhaust gas is emitted from an outflow end face of the honeycomb filter. In this way, the PM in the exhaust gas can be removed.

In the honeycomb filters, various studies have been made as to a shape of each of the cells defined by the partition walls. For example, a honeycomb filter or the like has been suggested in which in a cross section cut along a plane perpendicular to a longitudinal direction of the cells, each cross-sectional area of predetermined cells is different from that of the residual cells (e.g., see Patent Documents 1 and 2). An example of such a honeycomb filter is a honeycomb filter having a constitution where each cross-sectional area of cells opened on the side of the inflow end face (hereinafter referred to as "inflow cells" sometimes) is different from each cross-sectional area of cells opened on the side of the outflow end face (hereinafter referred to as "outflow cells" sometimes). For example, a honeycomb filter has been suggested in which for the purpose of increasing strength of the honeycomb filter, as to a shape of each cell in the above cross section, regions corresponding to corner portions of a quadrangular or more polygonal shape are formed in a circular shape (e.g., see Patent Documents 1 and 3).

[Patent Document 1] JP-A-2005-270969
[Patent Document 2] WO 2008/117559
[Patent Document 3] JP-A-2010-221159

SUMMARY OF THE INVENTION

According to a honeycomb filter described in Patent Document 1, in a cross section cut along a plane vertical to a longitudinal direction of cells, each cross-sectional area of predetermined cells is different from each cross-sectional area of the residual cells. Furthermore, in this honeycomb filter, a value of a ratio of a through channel hydraulic diameter of the cells having a large cross-sectional area to a through channel hydraulic diameter of the cells having a small cross-sectional area is 1.2 or more. Additionally, in this honeycomb filter, at least a cross-sectional shape of the cells having the large cross-sectional area is a quadrangular shape in which a portion corresponding to at least a corner is circular, and a value of a ratio of a minimum thickness of a portion where partition walls intersect to a thickness of the partition walls is 0.7 or more and less than 1.3.

According to the honeycomb filter described in Patent Document 1, it is explained that thin walls of a part of the portion where the partition walls intersect can be prevented and that high strength can be maintained. In most of conventional honeycomb filters, inflow cells and outflow cells are alternately arranged via the partition walls. Consequently, the honeycomb filter described in Patent Document 1 has a constitution where cracks are relatively easily generated to the partition walls defining the inflow cells and the outflow cells, in a case where the cracks are generated in the honeycomb filter due to thermal shock. Therefore, the honeycomb filter described in Patent Document 1 has the problem that PM such as soot easily leaks outside when the cracks are generated in the honeycomb filter.

A honeycomb filter described in Patent Document 2 also has a constitution where a portion in which partition walls intersect is thicker than each of the partition walls defining cells. In consequence, similarly to the above-mentioned honeycomb filter described in Patent Document 1, there has been the problem that PM such as soot easily leaks outside when cracks are generated in the honeycomb filter.

In a honeycomb filter described in Patent Document 3, as to a cross-sectional shape of each outflow cell, a region X corresponding to a corner portion of a quadrangular or more polygonal shape is circularly formed, and hence a strength of a portion where partition walls intersect is relatively high. Consequently, the highest temperature during regeneration of the honeycomb filter can lower, but when cracks are generated in the honeycomb filter, the cracks are relatively easily generated to the partition walls defining the inflow cells and the outflow cells. Therefore, when the cracks are generated in the honeycomb filter, there is the problem that PM such as soot easily leaks outside.

The present invention has been developed in view of the problems of such conventional technologies. The present invention provides a honeycomb filter which has an excellent thermal shock resistance and is capable of effectively inhibiting particulate matter such as soot from leaking outside.

According to the present invention, there is provided a honeycomb filter described hereinafter.

[1] A honeycomb filter including:

a honeycomb structure body having porous partition walls arranged to surround a plurality of cells extending from an inflow end face to an outflow end face to form through channels for a fluid, and a plugging portion disposed to plug either one of end portions of each of the cells on the side of the inflow end face or the side of the outflow end face, wherein the cells in which the plugging portions are arranged in end portions on the outflow end face side and which are opened on the inflow end face side are defined as inflow cells, the cells in which the plugging portions are arranged in end portions on the inflow end face side and which are opened on the outflow end face side are defined as outflow cells, in a cross section of the honeycomb structure body which is perpendicular to an extending direction of the cells, the honeycomb structure body includes at least a cell row in which the inflow cells and the outflow cells are alternately arranged via the partition walls in one direction, a value of a porosity of the partition wall in a partitioning region between the inflow cell and the outflow cell is defined as a porosity A, among intersecting portions where partitioning regions of the partition walls between the cells intersect one another, a value of a porosity of the partition wall in an intersecting portion between the two inflow cells is defined as a porosity B, and a value of A/B obtained by dividing the porosity A by the porosity B is from 0.50 to 0.95.

[2] The honeycomb filter according to the above [1], wherein the porosity A is from 15 to 70%.

[3] The honeycomb filter according to the above [1] or [2], wherein an arithmetic mean of the porosity A and the porosity B is from 25 to 80%.

[4] The honeycomb filter according to any one of the above [1] to [3], wherein a shape of the inflow cells in the cross section of the honeycomb structure body which is perpendicular to the extending direction of the cells is quadrangular, hexagonal or octagonal.

[5] The honeycomb filter according to the above [4], wherein a shape of the outflow cells in the cross section of the honeycomb structure body which is perpendicular to the extending direction of the cells is quadrangular, or hexagonal.

[6] The honeycomb filter according to any one of the above [1] to [5], wherein an open end area S1 of one of the inflow cells is larger than an open end area S2 of one of the outflow cells.

[7] The honeycomb filter according to any one of the above [1] to [6], wherein a thickness of the partition walls is from 100 to 450 μm.

A honeycomb filter of the present invention has an excellent thermal shock resistance and is capable of effectively inhibiting particulate matter such as soot from leaking outside. That is, in the honeycomb filter of the present invention, a porosity A of a partition wall in a partitioning region between an inflow cell and an outflow cell is relatively lower than a porosity B of the partition wall in an intersecting portion between two inflow cells. Consequently, when cracks are generated in the honeycomb filter, the cracks are easily generated to the above-mentioned intersecting portion of the partition walls. The cracks generated in the intersecting portion of the partition walls are generated in a diagonal direction to the intersecting portion to extend across the inflow cells or the outflow cells. Therefore, if such cracks are generated, the honeycomb filter is not affected to such an extent that the PM leaks outside. In consequence, according to the honeycomb filter of the present invention, it is possible to effectively inhibit particulate matter such as the soot from leaking outside.

DESCRIPTION OF THE PREFERRED EMBODIMENTS

Hereinafter, description will be made as to embodiments of the present invention. However, the present invention is not limited to the following embodiments. Therefore, it should be understood that changes, improvements and the like are suitably added to the following embodiments on the basis of ordinary knowledge of a person skilled in the art without departing from the gist of the present invention.

Figure 1:
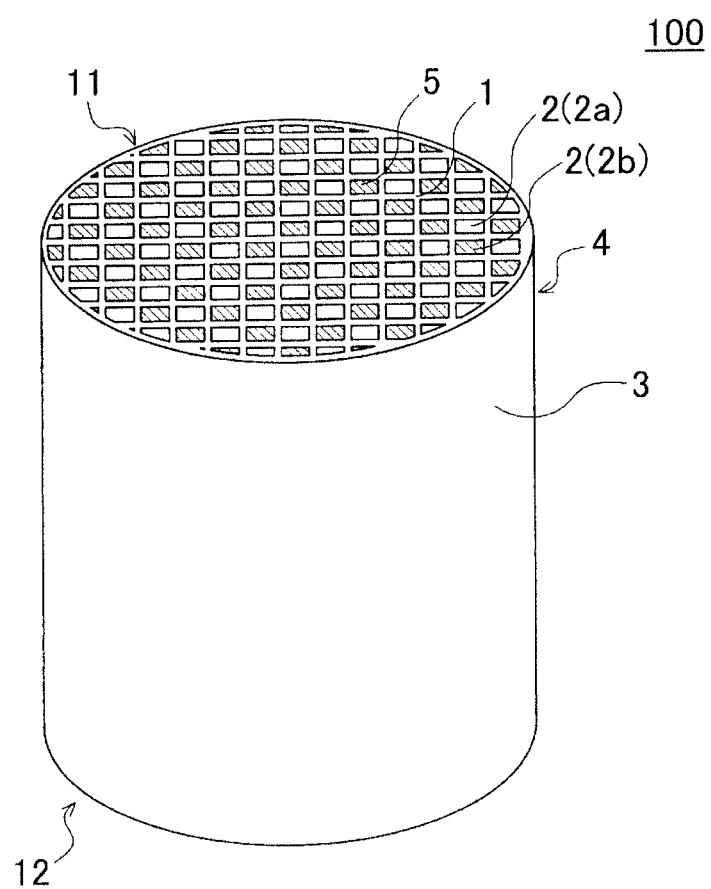
FIG. 1 is a perspective view schematically showing a first embodiment of a honeycomb filter of the present invention as seen from the side of an inflow end face.
Figure 2:
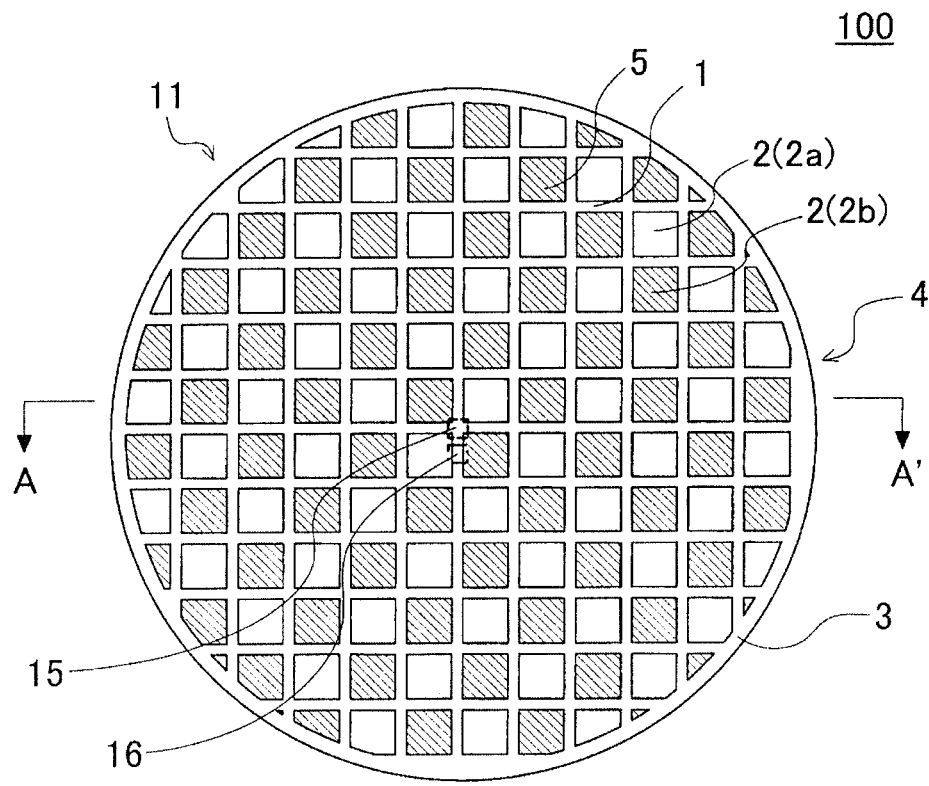
FIG. 2 is a plan view schematically showing the inflow end face of the honeycomb filter shown in FIG. 1.
Figure 3:
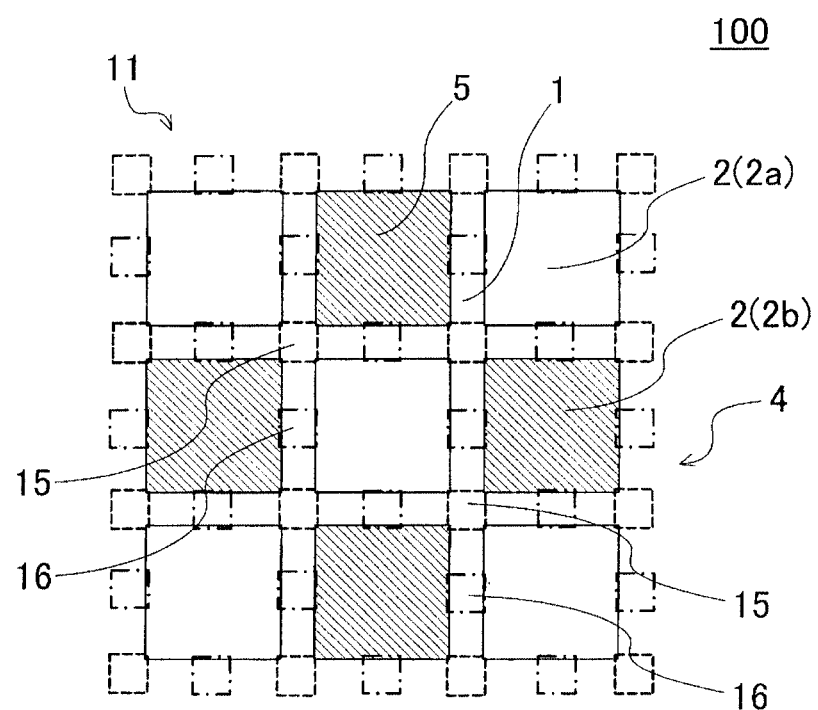
FIG. 3 is an enlarged plan view of an enlarged portion of the inflow end face of the honeycomb filter shown in FIG. 2.
Figure 4:
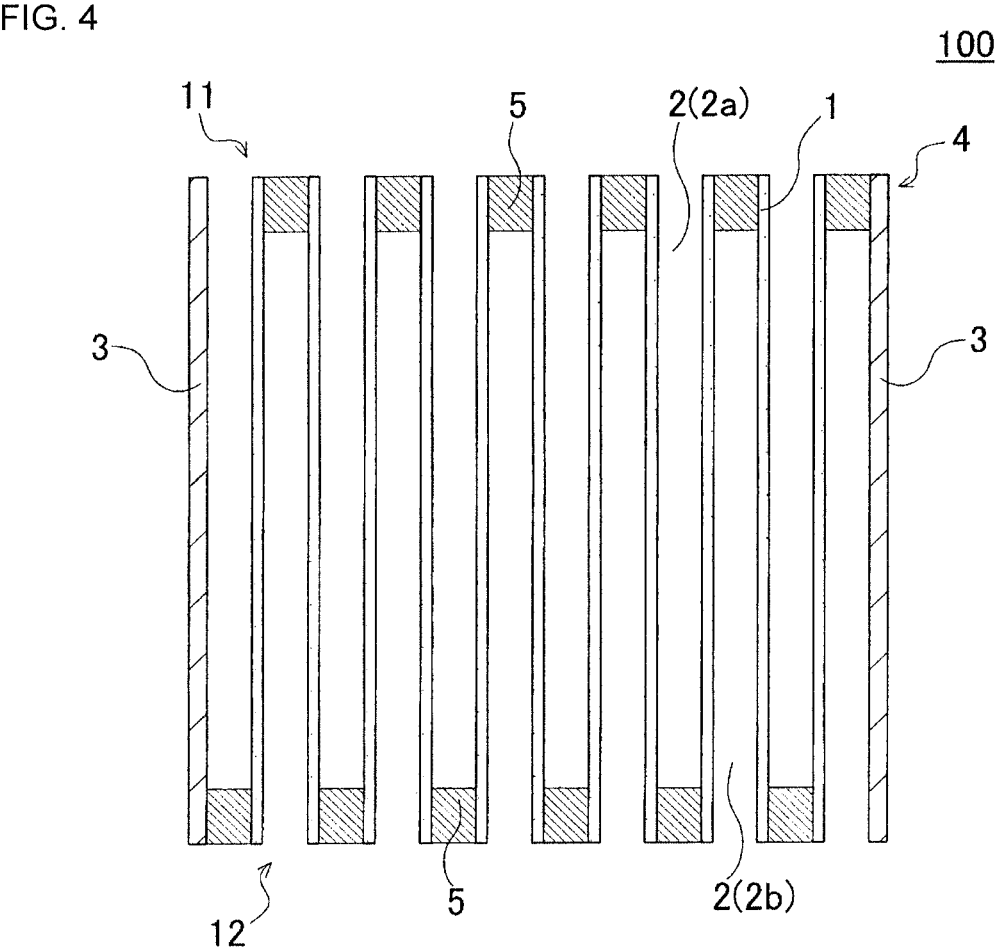
FIG. 4 is a cross-sectional view schematically showing a cross section taken along the A-A' line of FIG. 2.

(1) Honeycomb Filter (First Embodiment):

As shown in FIG. 1 to FIG. 4, a first embodiment of a honeycomb filter of the present invention is a honeycomb filter 100 including a honeycomb structure body 4 having porous partition walls 1, and a plugging portion 5 disposed in either one of end portions of each of cells 2 formed in the honeycomb structure body 4. Here, FIG. 1 is a perspective view schematically showing a first embodiment of the honeycomb filter of the present invention as seen from the side of an inflow end face. FIG. 2 is a plan view schematically showing the inflow end face of the honeycomb filter shown in FIG. 1. FIG. 3 is an enlarged plan view of an enlarged portion of the inflow end face of the honeycomb filter shown in FIG. 2. FIG. 4 is a cross-sectional view schematically showing a cross section taken along the A-A' line of FIG. 2.

The partition walls 1 of the honeycomb structure body 4 are arranged to surround a plurality of cells 2 extending from an inflow end face 11 to an outflow end face 12 to form through channels for a fluid. That is, the plurality of cells 2 are defined by the porous partition walls 1. The plugging portion 5 is disposed to plug either one of the end portions of each of the cells 2 formed in the honeycomb structure body 4. Consequently, each of the plurality of cells 2 has either one of the end portions that is plugged by the plugging portion 5 disposed at its open end on the side of the inflow end face 11 or the side of the outflow end face 12. In the honeycomb filter 100 of the present embodiment, the porous partition walls 1 function as a filter material to trap PM in an exhaust gas. Here, among the plurality of cells 2, the cells in which the plugging portions 5 are arranged at the open ends on the outflow end face 12 side and which are opened on the inflow end face 11 side are defined as inflow cells 2a. Furthermore, among the plurality of cells 2, the cells in which the plugging portions 5 are arranged at the open ends on the inflow end face 11 side and which are opened on the outflow end face 12 side are defined as outflow cells 2b.

In a cross section of the honeycomb structure body 4 which is perpendicular to an extending direction of the cells 2, the honeycomb structure body 4 includes at least a cell row in which the inflow cells 2a and the outflow cells 2b are alternately arranged via the partition walls 1 in one direction. It is to be noted that the honeycomb structure body 4 may have, in the above cross section, at least one "cell row in which the inflow cells 2a and the outflow cells 2b are alternately arranged via the partition walls 1 in one direction". In the honeycomb filter 100 shown in FIG. 1 to FIG. 4, each of cell rows extending in a longitudinal direction and a lateral direction along a paper surface is the cell row in which the inflow cells 2a and the outflow cells 2b are alternately arranged.

"The cell row in which the inflow cells 2a and the outflow cells 2b are alternately arranged via the partition walls 1 in one direction" means a cell row having the following constitution in a case where cross-sectional shapes of the inflow cells 2a and the outflow cells 2b are polygonal. That is, the above cell row means a cell row where the inflow cells 2a and the outflow cells 2b are arranged to be defined by the partition walls 1 each of which is constituted by two sides of the polygonal inflow cell 2a and the polygonal outflow cell 2b which face each other. Consequently, "the cell rows in each of which the inflow cells 2a and the outflow cells 2b are alternately arranged via the partition walls 1 in one direction" do not include a cell row in which a plurality of cells are arranged so that mutual vertexes of cross-sectional shapes (i.e., mutual vertexes of the polygonal cells) face each other. It is to be noted that the partition walls 1 which are present in a region where the mutual vertexes of the cross-sectional shapes of the plurality of cells face each other form "an intersecting portion 15" which will be described later.

The honeycomb filter 100 of the present embodiment is characterized in that a porosity (hereinafter referred to as a porosity A) of the partition wall 1 in a partitioning region 16 between the inflow cell 2a and the outflow cell 2b and a porosity (hereinafter referred to as a porosity B) of the partition walls 1 in the intersecting portion 15 between two inflow cells 2a indicate different values. More specifically, a value of the porosity of the partition wall 1 in the partitioning region 16 between the inflow cell 2a and the outflow cell 2b is defined as the porosity A. Furthermore, among the intersecting portions 15 where the partitioning regions of the partition walls 1 between the cells 2 (e.g., the partitioning regions 16) intersect one another, a value of the porosity of the partition wall 1 in the intersecting portion 15 between two inflow cells 2a is defined as the porosity B. In this case, a value of "the porosity A/the porosity B" obtained by dividing the porosity A by the porosity B is from 0.50 to 0.95. Hereinafter, "the porosity A/the porosity B" may simply be described as "A/B". In the honeycomb filter 100 of the present embodiment, the value of "A/B" is adjusted to the above-mentioned numeric range. Consequently, when cracks are unfavorably generated in the honeycomb filter 100, the cracks are easily generated to the intersecting portion 15 between the inflow cells 2a on the inflow end face 11 side. Furthermore, on the outflow end face 12 side, the cracks are easily generated to the intersecting portion 15 between the outflow cells 2b. That is, the cracks to be generated in the intersecting portion 15 are generated along a diagonal direction in the intersecting portion 15 due to an influence of a temperature difference in the honeycomb filter 100. In particular, on the inflow end face 11 side and the outflow end face 12 side of the honeycomb filter 100, the cracks are easily generated in the diagonal direction along which the cells 2 that are not provided with any plugging portions 5 are connected to each other, and the cracks are hard to be generated in the diagonal direction along which the cells provided with the plugging portions 5 are connected to each other. Here, even if the cracks are generated in the intersecting portion 15 between the inflow cells 2a on the inflow end face 11 side of the honeycomb filter 100, the honeycomb filter is not affected to such an extent that PM leaks outside. Similarly, even if the cracks are generated in the intersecting portion 15 between the outflow cells 2b on the outflow end face 12 side of the honeycomb filter 100, the honeycomb filter is not affected to such an extent that PM leaks outside. In consequence, the honeycomb filter 100 of the present embodiment is capable of effectively inhibiting the PM, such as soot, from leaking outside.

In the present description, "the intersecting portion 15" refers to a region where the partitioning regions of the partition walls 1 between the cells 2 intersect one another. Specifically, the portion refers to the following position in the cross section of the honeycomb structure body 4 which is perpendicular to the extending direction of the cells 2. "The intersecting portion 15" refers to a region where the partition wall 1 disposed along a first direction to constitute a lattice and the partition wall 1 disposed along a second direction which is different from the first direction intersect each other (a region where lattice lines are superimposed) among the partition walls 1 arranged in a latticed manner to surround the plurality of cells 2. Here, "the first direction of the lattice" includes a direction parallel to the partitioning region of the partition wall 1 between two cells 2, and a trajectory is drawn along this partition wall 1 as if one stroke were written. In the first direction of the lattice, it is to be noted that in a case where a partition wall 21 bends to this first direction as in a honeycomb filter 200 which will be described later with reference to FIG. 5, the direction is selected so that a bending angle of the partition wall 21 to the first direction becomes smaller. Also, "the second direction of the lattice" can be prescribed similarly to the above-mentioned "first direction of the lattice".

Hereinafter, in the present description, the value of the porosity of the partition wall 1 in the partitioning region 16 between the inflow cell 2a and the outflow cell 2b may simply be referred to as "the porosity A" in the honeycomb filter 100 shown in FIG. 1 to FIG. 4. An example of the partitioning region 16 between the inflow cell 2a and the outflow cell 2b is the partitioning region 16 between the inflow cell 2a and the outflow cell 2b in the cell row in which the inflow cells 2a and the outflow cells 2b are alternately arranged via the partition walls 1 in one direction. Furthermore, the value of the porosity of the partition wall 1 in the intersecting portion 15 between two inflow cells 2a may simply be referred to as "the porosity B". "The intersecting portion 15 between the two inflow cells 2a" is "a region where vertexes of cross-sectional shapes of two or more inflow cells 2a face each other" in a case where a shape of each cell 2 is quadrangular. Consequently, three or more inflow cells 2a may be arranged to face each other "in the intersecting portion 15 between two inflow cells 2a". Furthermore, as to the above-mentioned "vertex of the cross-sectional shape of the inflow cell 2a", a region corresponding to the vertex of the corresponding cross-sectional shape may be rounded or linearly chamfered. It is to be noted that in a case where quadrangular cells 22 and octagonal cells 22 are alternately arranged via the partition walls 21 in one cell row as in the honeycomb filter 200 which will be described later with reference to FIG. 5, the octagonal cells 22 can be treated as the chamfered quadrangular cells 22.

In the present invention, it is considered that each of the porosity A and porosity B of the partition walls 1 is a value obtained by the following method. Firstly, a sample piece for which the porosity A and the porosity B are to be measured is cut out from the honeycomb filter 100. Respective regions from which the sample pieces are to be cut out are five regions on each of the inflow end face 11 side and the outflow end face 12 side of the honeycomb filter 100, i.e., ten regions in total. As to a region to be cut out in each end face, a central position of each end face is considered as a first cut-out region. Then, in each end face, four intermediate points between the central position and a circumferential edge of the honeycomb filter 100 on X-axis and Y-axis which pass this central position and are perpendicular to each other are considered as four residual cut-out regions.

The sample piece for which the porosity A is to be measured is cut out from each of the above-mentioned ten regions so as to include the partition wall 1 of a central portion of the partition wall 1 partitioning between the inflow cell 2a and the outflow cell 2b. A length of one side of the sample piece for which the porosity A is to be measured is considered as a thickness of the partition wall 1 of the above-mentioned central portion, a length of another side thereof is adjusted to 100 μm in an extending direction of the partition walls 1 in each end face, and a length of still another side thereof is adjusted to 20 mm in the extending direction of the cells 2.

The sample piece for which the porosity B is to be measured is cut out from each of the above-mentioned ten regions so as to include a central portion of the intersecting portion 15 of the partition walls 1. The sample piece for which the porosity B is to be measured is considered as an end face of a square in which a length of one side is adjusted to 100 μm, taking the central portion of the intersecting portion 15 of the partition walls 1 as its center, and a length of the sample piece in an axial direction is adjusted to 20 mm in the extending direction of the cells 2.

The sample piece cut out from the honeycomb filter 100 and prepared in this manner is embedded in epoxy resin to harden, and then its surface is polished. Then, each sample piece is cut outside as much as 5 mm in a total length direction, and its cut surface is considered as an observation surface with a scanning electron microscope (hereinafter referred to also as "SEM"). The SEM is an abbreviation for "the scanning electron microscope". As the scanning electron microscope, for example, a scanning electron microscope "model No. S3200-N" manufactured by Hitachi High-Technologies Corporation is usable.

Afterward, the observation surface of the prepared sample piece is observed with the SEM, and an SEM image is acquired. During the measurement of the porosity A of the partition walls 1, the above SEM image is acquired as to the partition wall 1 in the observation surface of each of the above ten sample pieces. The SEM image is enlarged to 100 times and observed. Furthermore, during the measurement of the porosity B of the partition wall 1, the above SEM image is acquired as to the intersecting portion 15 of the partition walls 1 in each observation surface of the above ten sample pieces. Next, in each image, "an area S1 of the partition wall 1" and "an area S2 of a pore portion (a void portion)" are calculated by using image analysis software. Then, the porosity of the imaged partition wall 1 of each image is calculated in accordance with "Formula (1): $S2/(S1+S2)$". As values of S1 and S2, average values of porosities of the respective ten regions are used.

As to the honeycomb filter 100 for which the porosity is to be measured, in a case where an exhaust gas purifying catalyst (not shown) is loaded onto the surfaces of the partition walls 1 and interiors of the pores of the partition walls 1, a portion onto which the catalyst is loaded is regarded as the pore portion of the partition wall 1, and the porosity is obtained. That is, in a method of measuring the above-mentioned porosity A and porosity B, after the SEM image is obtained, a region where it is judged from color information that the catalyst is present in the obtained SEM image is identified as the pore portion of the partition wall 1, and then its porosity is obtained.

When A/B that is the value obtained by dividing the porosity A by the porosity B is less than 0.50, the cracks may continuously be generated in two or more intersecting portions 15 arranged diagonally adjacent to each other among the intersecting portions 15 of the partition walls 1, and it becomes difficult to sufficiently inhibit the PM from leaking outside. Furthermore, when the above A/B is in excess of 0.95, the cracks are also likely to enter the partition wall 1 in the partitioning region 16 between the inflow cell 2a and the outflow cell 2b, and it becomes difficult to inhibit the PM from leaking outside.

The value of A/B obtained by dividing the porosity A by the porosity B is from 0.50 to 0.95 and preferably from 0.55 to 0.90. According to such a constitution, it is possible to more effectively inhibit the PM, such as the soot, from leaking outside.

There are not any special restrictions on the value of the porosity B, but the value is preferably from 25 to 80% and further preferably from 30 to 75%. When the value of the porosity B is less than 25%, a pressure loss rise might be caused. Furthermore, when the value of the porosity B is in excess of 80%, an isostatic strength of the honeycomb filter 100 might deteriorate. Additionally, there are not any special restrictions on the value of the porosity A, but the value is preferably from, for example, 15 to 70%.

An arithmetic mean of the porosity A and the porosity B is preferably from 20 to 75% and further preferably from 25 to 70%. When the arithmetic mean of the porosity A and the porosity B is less than 20%, the pressure loss rise might be caused. Furthermore, when the arithmetic mean of the porosity A and the porosity B is in excess of 75%, the isostatic strength of the honeycomb filter 100 might deteriorate.

There are not any special restrictions on the shape of each cell 2 (hereinafter referred to simply as "the cell shape") in the cross section of the honeycomb structure body 4 which is perpendicular to the extending direction of the cells 2. For example, it is preferable that the shape of the inflow cell 2a is quadrangular, hexagonal or octagonal. Furthermore, it is preferable that the shape of the outflow cell 2b is quadrangular or hexagonal. Additionally, the shape of each cell 2 may be a shape obtained by forming corner portions of a polygonal shape in a curved shape, for example, a substantially quadrangular shape obtained by forming corner portions of a quadrangular shape in a curved shape.

The thickness of the partition walls 1 is preferably from 100 to 450 µm, further preferably from 120 to 430 µm, and especially preferably from 140 to 400 µm. When the thickness of the partition walls 1 is less than 100 µm, the isostatic strength of the honeycomb filter 100 might deteriorate. When the thickness of the partition walls 1 is in excess of 450 µm, a pressure loss might increase, and an output drop of an engine or a deterioration of fuel efficiency might be caused. The thickness of the partition wall 1 is a value measured by a method of observing, with an optical microscope, a cross section of the honeycomb filter 100 which is perpendicular to an axial direction.

There are not any special restrictions on an overall shape of the honeycomb filter 100. An example of the overall shape of the honeycomb filter 100 shown in FIG. 1 to FIG. 4 is a round pillar shape in which the inflow end face 11 and the outflow end face 12 are round. Another example of the overall shape of the honeycomb filter 100 may be a pillar shape in which an inflow end face and an outflow end face have a substantially round shape such as an elliptic shape, a racetrack shape, or an oblong shape. Alternatively, the overall shape of the honeycomb filter 100 may be a prismatic columnar shape in which the inflow end face 11 and the outflow end face 12 have a polygonal shape such as a quadrangular shape or a hexagonal shape.

There are not any special restrictions on a material constituting the partition walls 1, but from the viewpoints of a strength, a heat resistance, a durability and the like, it is preferable that a main component is any type of ceramics of an oxide or a non-oxide, a metal, or the like. Specifically, it is considered that examples of ceramics include cordierite, mullite, alumina, spinel, silicon carbide, silicon nitride, and aluminum titanate. It is considered that examples of the metal include a Fe—Cr—Al based metal and metal silicon. It is preferable to use at least one selected from the group consisting of these materials as the main component. From the viewpoints of a high strength, a high heat resistance and the like, it is especially preferable to use at least one selected from the group consisting of alumina, mullite, aluminum titanate, cordierite, silicon carbide and silicon nitride, as the main component. Furthermore, from the viewpoints of a high thermal conductivity, a high heat resistance and the like, silicon carbide or a silicon-silicon carbide composite material is especially suitable. Here, "the main component" means a component constituting 50 mass % or more of the partition walls 1. The above component is included in the material constituting the partition walls 1 as much as preferably 70 mass % or more and further preferably 80 mass % or more.

It is preferable that a material of the plugging portions 5 is a material which is considered to be the preferable material of the partition walls. The material of the plugging portions 5 and the material of the partition walls 1 may be the same material or different materials.

In the honeycomb filter 100 of the present embodiment, an exhaust gas purifying catalyst may be loaded onto at least one of each of the surfaces of the partition walls 1 of the honeycomb structure body 4 and each of the pores of the partition walls 1. According to this constitution, CO, $NO_x$, HC and the like in the exhaust gas can be changed to harmless substances by a catalytic reaction. Furthermore, an oxidation of the soot trapped in the partition walls 1 can be promoted.

When the catalyst is loaded onto the honeycomb filter 100 of the present embodiment, it is preferable that the catalyst includes at least one selected from the group consisting of an SCR catalyst, a $NO_x$ absorber catalyst and an oxidation catalyst. The SCR catalyst is a catalyst to selectively reduce components to be purified. In particular, it is preferable that the SCR catalyst is a $NO_x$ selectively reducing SCR catalyst to selectively reduce $NO_x$ in the exhaust gas. Furthermore, an example of the SCR catalyst is a metal-substituted zeolite. Examples of a metal in the metal-substituted zeolite include iron (Fe) and copper (Cu). A suitable example of zeolite is a beta zeolite. Furthermore, the SCR catalyst may be a catalyst containing at least one selected from the group consisting of vanadium and titania, as a main component. Examples of the $NO_x$ absorber catalyst include an alkali metal and an alkali earth metal. Examples of the alkali metal include potassium, sodium, and lithium. An example of the alkali earth metal is calcium. An example of the oxidation catalyst is a catalyst containing a noble metal. Specifically, it is preferable that the oxidation catalyst contains at least one selected from the group consisting of platinum, vanadium and rhodium.

Figure 5:
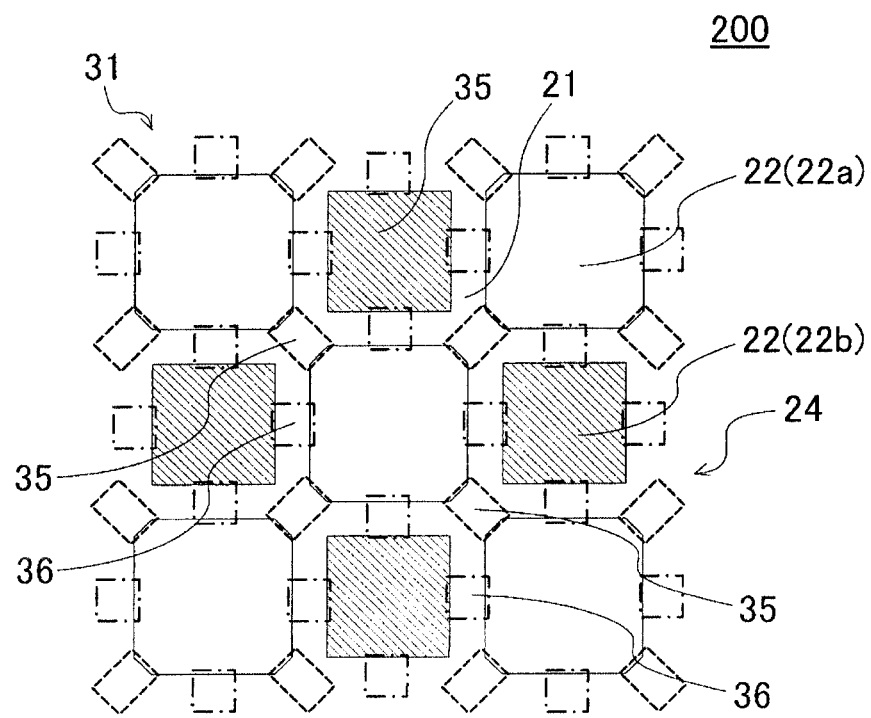
FIG. 5 is an enlarged plan view schematically showing a second embodiment of the honeycomb filter of the present invention, in which a portion of an inflow end face is enlarged.
Figure 6:
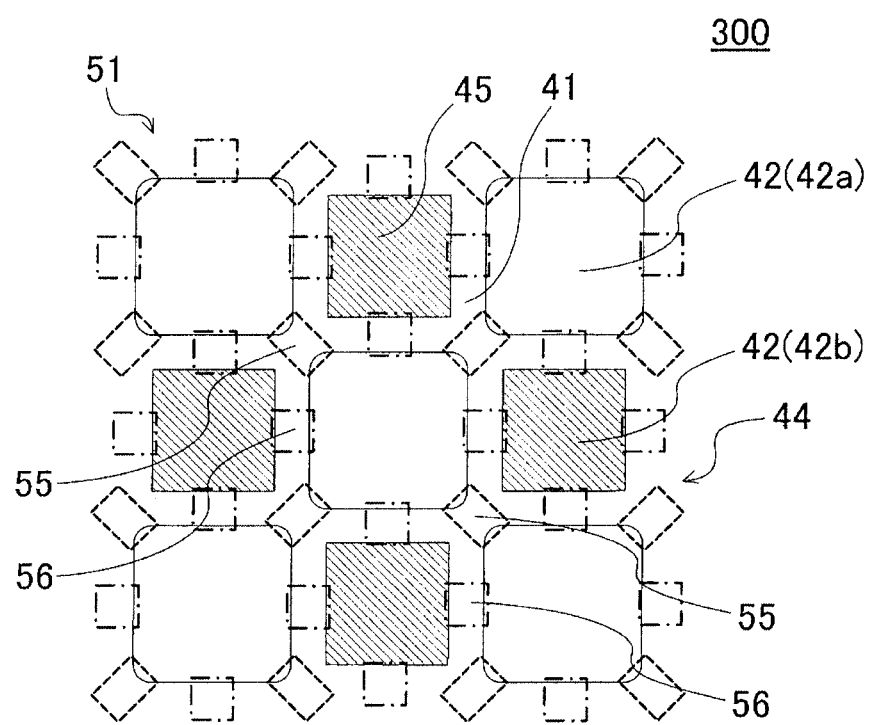
FIG. 6 is an enlarged plan view schematically showing a third embodiment of the honeycomb filter of the present invention, in which a portion of an inflow end face is enlarged.
Figure 7:
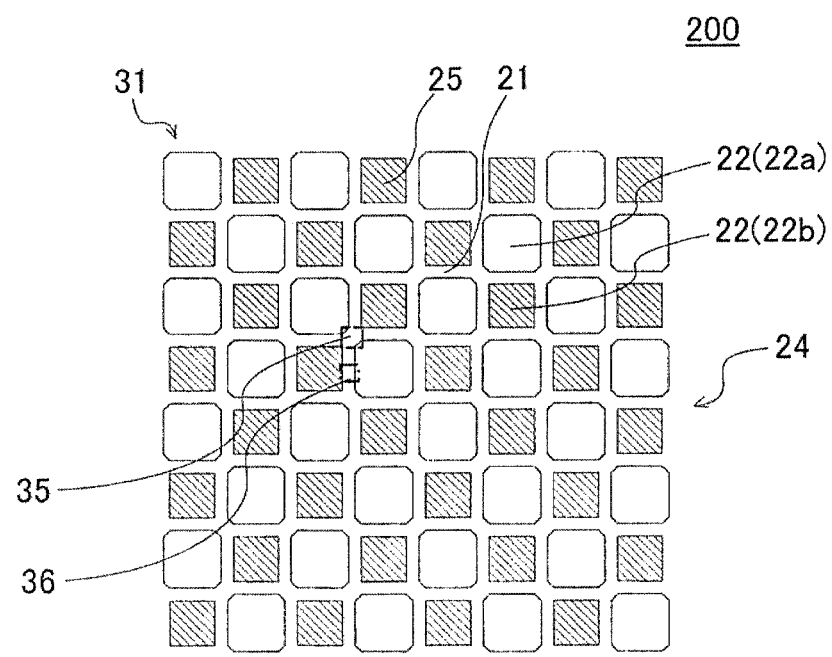
FIG. 7 is a plan view schematically showing the second embodiment of the honeycomb filter of the present invention, and showing a portion of the inflow end face.
Figure 8:
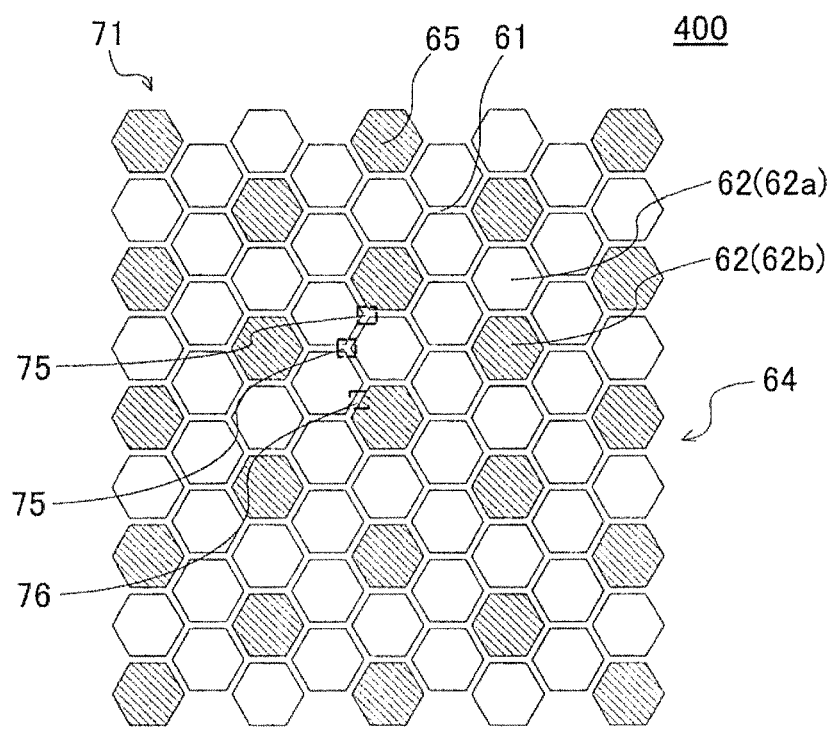
FIG. 8 is a plan view schematically showing a fourth embodiment of the honeycomb filter of the present invention, and showing a portion of an inflow end face.
Figure 9:
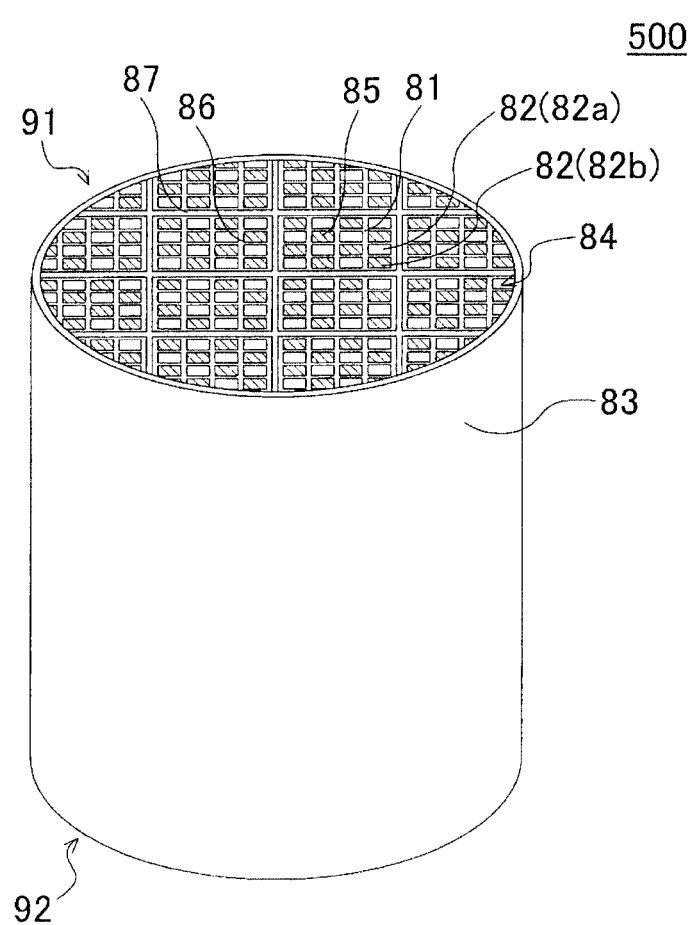
FIG. 9 is a perspective view schematically showing a fifth embodiment of the honeycomb filter of the present invention as seen from the side of an inflow end face.
Figure 10:
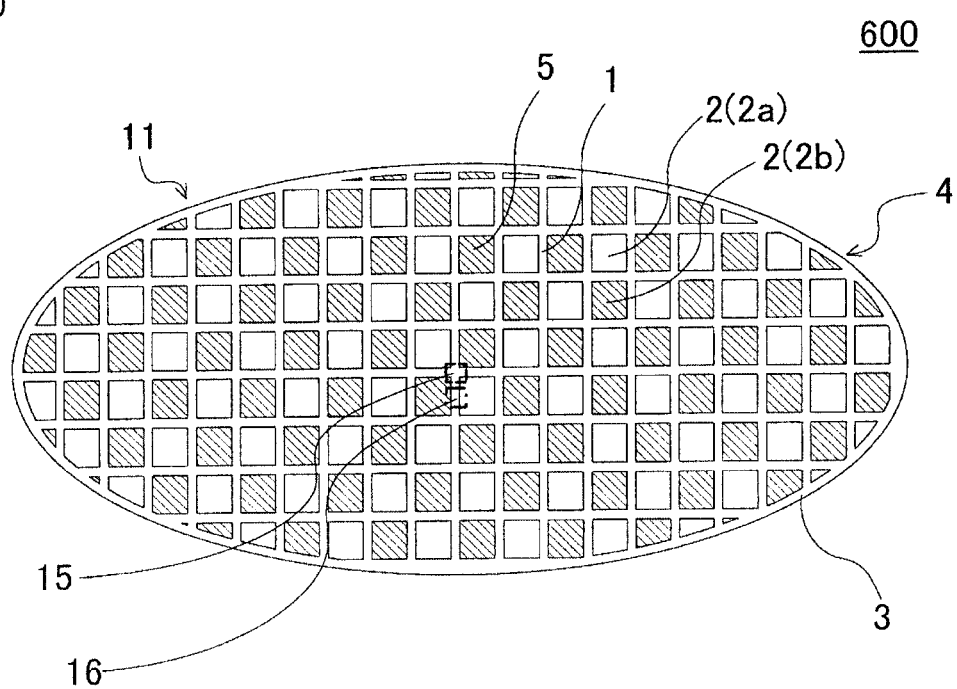
FIG. 10 is a plan view schematically showing an inflow end face of a sixth embodiment of the honeycomb filter of the present invention.

(2) Honeycomb Filter (Second Embodiment to Sixth Embodiment):

Next, a second embodiment to a sixth embodiment of the honeycomb filter of the present invention will be described with reference to FIG. 5 to FIG. 10. Here, FIG. 5 is an enlarged plan view schematically showing the second embodiment of the honeycomb filter of the present invention, in which a portion of an inflow end face is enlarged. FIG. 6 is an enlarged plan view schematically showing the third embodiment of the honeycomb filter of the present invention, in which a portion of an inflow end face is enlarged. FIG. 7 is a plan view schematically showing the second embodiment of the honeycomb filter of the present invention, and showing a portion of the inflow end face. FIG. 8 is a plan view schematically showing the fourth embodiment of the honeycomb filter of the present invention, and showing a portion of an inflow end face. FIG. 9 is a perspective view schematically showing the fifth embodiment of the honeycomb filter of the present invention as seen from the side of an inflow end face. FIG. 10 is a plan view schematically showing an inflow end face of the sixth embodiment of the honeycomb filter of the present invention.

As shown in FIG. 5 and FIG. 7, the second embodiment of the honeycomb filter of the present invention is the honeycomb filter 200 including a honeycomb structure body 24 having porous partition walls 21, and a plugging portion 25 disposed in either one of end portions of each of the cells 22 formed in the honeycomb structure body 24. In a cross section of the honeycomb structure body 24 which is perpendicular to an extending direction of the cells 22, the honeycomb structure body 24 includes at least a cell row in which inflow cells 22a and outflow cells 22b are alternately arranged via the partition walls 21 in one direction.

In the honeycomb filter 200 of the second embodiment, a shape of the inflow cell 22a is "an octagon" and a shape of the outflow cell 22b is "a quadrangle". A cross-sectional area of the octagonal inflow cell 22a is relatively larger than a cross-sectional area of the quadrangular outflow cell 22b. Furthermore, in a case where a value of a porosity of the partition wall 21 in a partitioning region 36 between the inflow cell 22a and the outflow cell 22b is designated as A and a value of a porosity of the partition wall 21 in an intersecting portion 35 between two inflow cells 22a is designated as B, a value of A/B is from 0.5 to 0.95. The honeycomb filter 200 of the second embodiment having such a constitution can obtain technological effects similar to those of the honeycomb filter 100 of the hitherto described first embodiment (see FIG. 1 to FIG. 4). It is preferable that the honeycomb filter 200 of the second embodiment has a constitution similar to that of the honeycomb filter 100 of the first embodiment (see FIG. 1 to FIG. 4) except that shapes of the inflow cell 22*a* and the outflow cell 22*b* are different. It is to be noted that in a case where the quadrangular cells 22 and the octagonal cells 22 are alternately arranged via the partition walls 21 in one cell row, the octagonal cells 22 can be treated as the chamfered quadrangular cells 22.

In the honeycomb filter 200, a cross-sectional area of the inflow cell 22*a* is relatively larger than a cross-sectional area of the outflow cell 22*b*, and hence even if cracks are generated in the honeycomb filter 200, it is possible to more effectively inhibit PM such as soot from leaking outside. That is, also in a situation where cracks are unfavorably generated in the honeycomb filter 200, the cracks can more preferentially be generated in "the intersecting portion 35 that is a region to define the inflow cells 22*a* from each other" and which is harder to be affected to such an extent that the PM leaks outside. Therefore, in "the partitioning region 36 between the inflow cell 22*a* and the outflow cell 22*b*", cracks connecting the inflow cell 22*a* to the outflow cell 22*b* can be harder to be generated.

In a case where an open end area S1 of one inflow cell 22*a* is larger than an open end area S2 of one outflow cell 22*b* as in the honeycomb filter 200, a value (S2/S1) of a ratio of the open end area S2 to the open end area S1 is preferably from 0.20 to 0.95 and further preferably from 0.30 to 0.90. According to such a constitution, in the intersecting portion 35, it is possible to remarkably effectively inhibit the generation of cracks via which the inflow cells 22*a* communicate with the outflow cells 22*b*.

As shown in FIG. 6, the third embodiment of the honeycomb filter of the present invention is a honeycomb filter 300 including a honeycomb structure body 44 having porous partition walls 41, and a plugging portion 45 disposed in either one of end portions of each of cells 42 formed in the honeycomb structure body 44. In a cross section of the honeycomb structure body 44 which is perpendicular to an extending direction of the cells 42, the honeycomb structure body 44 includes at least a cell row in which inflow cells 42*a* and outflow cells 42*b* are alternately arranged via the partition walls 41 in one direction.

In the honeycomb filter 300 of the third embodiment, a shape of the inflow cell 42*a* is "a quadrangle with each rounded vertex", and a shape of the outflow cell 42*b* is "a quadrangle". A cross-sectional area of the inflow cell 42*a* is relatively larger than a cross-sectional area of the outflow cell 42*b*. Furthermore, in a case where a value of a porosity of the partition wall 41 in a partitioning region 56 between the inflow cell 42*a* and the outflow cell 42*b* is designated as A and a value of a porosity of the partition wall 41 in an intersecting portion 55 between two inflow cells 42*a* is designated as B, a value of A/B is from 0.5 to 0.95. The honeycomb filter 300 of the third embodiment having such a constitution can obtain technological effects similar to those of the honeycomb filter 100 of the hitherto described first embodiment (see FIG. 1 to FIG. 4). It is preferable that the honeycomb filter 300 of the third embodiment has a constitution similar to that of the honeycomb filter 100 of the first embodiment (see FIG. 1 to FIG. 4) except that shapes of the inflow cell 42*a* and the outflow cell 42*b* are different.

As shown in FIG. 8, the fourth embodiment of the honeycomb filter of the present invention is a honeycomb filter 400 including a honeycomb structure body 64 having porous partition walls 61, and a plugging portion 65 disposed in either one of end portions of each of cells 62 formed in the honeycomb structure body 64. In a cross section of the honeycomb structure body 64 which is perpendicular to an extending direction of the cells 62, the honeycomb structure body 64 includes at least a cell row in which inflow cells 62*a* and outflow cells 62*b* are alternately arranged via the partition walls 61 in one direction.

In the honeycomb filter 400 of the fourth embodiment, a shape of each of the inflow cell 62*a* and the outflow cell 62*b* is "a hexagon". Furthermore, in a case where a value of a porosity of the partition wall 61 in a partitioning region 76 between the inflow cell 62*a* and the outflow cell 62*b* is designated as A and a value of a porosity of the partition wall 61 in an intersecting portion 75 between two inflow cells 62*a* is designated as B, a value of A/B is from 0.5 to 0.95. The honeycomb filter 400 of the fourth embodiment having such a constitution can obtain technological effects similar to those of the honeycomb filter 100 of the hitherto described first embodiment (see FIG. 1 to FIG. 4). It is preferable that the honeycomb filter 400 of the fourth embodiment has a constitution similar to that of the honeycomb filter 100 of the first embodiment (see FIG. 1 to FIG. 4) except that shapes of the inflow cell 62*a* and the outflow cell 62*b* are different.

In a case where a shape of the cell 62 is hexagonal, as "the intersecting portion 75 between two inflow cells 62*a*", two types of intersecting portions 75 are present, i.e., "the intersecting portion 75 that is present between two inflow cells 62*a* and one outflow cell 62*b*" and "the intersecting portion 75 that is present among three inflow cells 62*a*" are present. In the honeycomb filter 400 of the present embodiment, in a case where a value of a porosity of either one of the intersecting portions 75, i.e., the above-mentioned two types of intersecting portions 75 is defined as a porosity B, A/B may be from 0.50 to 0.95. It is to be noted that in a case where a value of a porosity in the intersecting portion 75 that is present among the three inflow cells 62*a* is defined as the porosity B, A/B is more preferably from 0.50 to 0.95.

As shown in FIG. 9, the fifth embodiment of the honeycomb filter of the present invention is a honeycomb filter 500 including a honeycomb structure body 84, and a plugging portion 85 disposed in either one of end portions of each of cells 82 formed in the honeycomb structure body 84. In particular, in the honeycomb filter 500, each honeycomb structure body 84 is constituted of a pillar-shaped honeycomb segment 86, and side surfaces of a plurality of honeycomb segments 86 are bonded to one another by a bonding layer 87. That is, in the honeycomb filter 500 of the present embodiment, each of the individual honeycomb segments 86 constituting the honeycomb filter of a segmented structure corresponds to the honeycomb structure body 84 in the honeycomb filter 500. Here, "the honeycomb filter of the segmented structure" refers to a honeycomb filter constituted by bonding the plurality of individually prepared honeycomb segments 86. It is to be noted that the honeycomb filter 100 in which all the partition walls 1 of the honeycomb structure body 4 are integrally formed as shown in FIG. 1 to FIG. 4 may be referred to as "a monolithic honeycomb filter". The honeycomb filter of the present invention may be "the honeycomb filter of the segmented structure" or "the monolithic honeycomb filter".

In the honeycomb filter 500, it is preferable that at least one honeycomb segment 86 has a constitution similar to that of the honeycomb structure body of the hitherto described honeycomb filter of the first embodiment. The honeycomb filter 500 can obtain technological effects similar to those of the hitherto described honeycomb filter of the first embodiment. The plurality of honeycomb segments 86 may have the same cell structure or may have different cell structures, respectively.

It is preferable that a circumferential wall 83 in the honeycomb filter 500 is a circumference coating layer formed by a circumference coating material. The circumference coating material is a coating material to be coated on a circumference of a bonded body obtained by bonding the plurality of honeycomb segments 86, thereby forming the circumference coating layer. Furthermore, it is preferable that the bonded body in which the plurality of honeycomb segments 86 are bonded is prepared by grinding a circumferential portion of the bonded body and providing the above-mentioned circumference coating layer thereon. Furthermore, also as to the monolithic honeycomb filter 100 shown in FIG. 1 to FIG. 4, a circumferential wall 3 disposed on a circumference of the honeycomb structure body 4 may be such a circumference coating layer formed by a circumference coating material as described above.

In the honeycomb filter 500 shown in FIG. 9, shapes of the cells 82 (i.e., inflow cells 82*a* and outflow cells 82*b*) are quadrangular. However, the shape of each cell 82 in each honeycomb segment 86 is not limited to the quadrangle, and the shapes of the cells in each of the hitherto described honeycomb filters of the first embodiment to the fourth embodiment are employable.

As shown in FIG. 10, the sixth embodiment of the honeycomb filter of the present invention is a honeycomb filter 600 including a honeycomb structure body 4, and a plugging portion 5 disposed in either one of end portions of each of cells 2 formed in the honeycomb structure body 4. In particular, in the honeycomb filter 600, an overall shape of the honeycomb filter 600 is a pillar shape having elliptic end faces. That is, as shown in FIG. 10, a shape of an inflow end face 11 is elliptic. It is preferable that the honeycomb filter has a constitution similar to that of the honeycomb filter 100 of the first embodiment (see FIG. 1 to FIG. 4) except that the overall shape of the honeycomb filter 600 is different.

In the honeycomb filter 600 shown in FIG. 10, shapes of the cells 2 (i.e., the inflow cells 2*a* and the outflow cells 2*b*) are quadrangular. However, the shape of each cell 2 is not limited to the quadrangle, and the shapes of the cells in each of the hitherto described honeycomb filters of the first embodiment to the fourth embodiment are employable.

(3) Manufacturing Method of Honeycomb Filter:

Next, a method of manufacturing the honeycomb filter of the present invention will be described. An example of the manufacturing method of the honeycomb filter of the present invention is a method including a step of preparing a honeycomb formed body, a step of forming plugging portions at open ends of cells, and a step of drying and firing the honeycomb formed body.

(3-1) Forming Step:

The forming step is a step of extruding a kneaded material obtained by kneading a forming raw material into a honeycomb shape to obtain the honeycomb formed body. The honeycomb formed body has partition walls defining cells extending from a first end face to a second end face, and a circumferential wall formed to surround an outermost circumference of the partition walls. A part of a honeycomb structure constituted of the partition walls corresponds to a honeycomb structure body. In the forming step, the forming raw material is initially kneaded to obtain the kneaded material. Next, the obtained kneaded material is extruded, thereby obtaining the honeycomb formed body in which the partition walls and the circumferential wall are monolithically formed.

It is preferable that the forming raw material is a ceramic raw material to which a dispersing medium and an additive are added. Examples of the additive include an organic binder, a pore former, and a surfactant. An example of the dispersing medium is water. As the forming raw material, there is usable a material similar to a forming raw material used in a heretofore known honeycomb filter manufacturing method.

An example of a method of kneading the forming raw material to form the kneaded material is a method in which a kneader, a vacuum pugmill or the like is used.

The extrusion can be performed by using an extruding die in which slits corresponding to a cross-sectional shape of the honeycomb formed body are formed. For example, as the extruding die, it is preferable to use a die in which there are formed slits corresponding to the shapes of the cells in each of the hitherto described honeycomb filters of the first embodiment to the fourth embodiment.

Here, in the extrusion, it is preferable to raise an extrusion speed and heighten an extrusion pressure during the formation. Thus, the extrusion is performed by this method, so that "the partition wall in the partitioning region between the inflow cell and the outflow cell" can be densified more than that in another region. That is, in the obtained honeycomb filter, "the porosity B of the partition wall in the intersecting portion between two inflow cells" can relatively be increased. In consequence, the value of A/B obtained by dividing the porosity A of the partition wall in the partitioning region between the inflow cell and the outflow cell by the porosity B of the partition wall in the intersecting portion between the two inflow cells can be adjusted to a numeric range of 0.5 to 0.95.

(3-2) Plugging Step:

A plugging step is a step of plugging open ends of the cells to form the plugging portions. For example, in the plugging step, the open ends of the cells are plugged with a material similar to the material used in manufacturing the honeycomb formed body, to form the plugging portions. The method of forming the plugging portions can be performed in conformity with the heretofore known honeycomb filter manufacturing method.

(3-3) Firing Step:

A firing step is a step of firing the honeycomb formed body in which the plugging portions are formed, to obtain the honeycomb filter. The obtained honeycomb formed body may be dried with, for example, microwaves and hot air, before the honeycomb formed body in which the plugging portions are formed is fired. Alternatively, for example, the firing step of firing the honeycomb formed body is initially performed before the plugging portions are formed, and then, the above-mentioned plugging step may be performed to a honeycomb fired body obtained in the firing step.

A firing temperature in firing the honeycomb formed body can suitably be determined in accordance with a material of the honeycomb formed body. For example, when the material of the honeycomb formed body is cordierite, the firing temperature is preferably from 1380 to 1450° C. and further preferably from 1400 to 1440° C. Furthermore, it is preferable that a firing time is from about 4 to 6 hours as a time to keep the highest temperature.

EXAMPLES

Hereinafter, the present invention will further specifically be described in accordance with examples, but the present invention is not limited to these examples.

Example 1

To 100 parts by mass of cordierite forming raw material, 0.5 parts by mass of pore former, 33 parts by mass of dispersing medium and 5.6 parts by mass of organic binder were added, mixed and kneaded to prepare a kneaded material. As the cordierite forming raw material, alumina, aluminum hydroxide, kaolin, talc and silica were used. Water was used as the dispersing medium, a water absorbable polymer having an average particle diameter of 10 to 50 μm was used as the pore former, methylcellulose was used as the organic binder, and dextrin was used as a dispersing agent.

Next, the kneaded material was extruded by using a predetermined die, to obtain a honeycomb formed body in which a cell shape was quadrangular and an overall shape was a round pillar shape. Additionally, during the extrusion, there was used an extruding die in which slits corresponding to a cross-sectional shape of the honeycomb formed body were formed, and in the extrusion, an extrusion speed was raised and an extrusion pressure was heightened as compared with after-mentioned Comparative Example 1, to perform the formation.

Then, the honeycomb formed body was dried in a hot air drier. During the drying, ambient temperature was set at 95 to 145° C.

Next, plugging portions were formed in the dried honeycomb formed body. Specifically, a mask was initially applied to an inflow end face of the honeycomb formed body to cover inflow cells. Afterward, an end portion of a masked side of the honeycomb formed body was immersed into a plugging slurry, to charge the plugging slurry into open ends of outflow cells which were not masked. Afterward, also as to an outflow end face of the honeycomb formed body, the plugging slurry was charged into open ends of the inflow cells by a method similar to the above method. Afterward, the honeycomb formed body in which the plugging portions were formed was further dried with the hot air drier.

Next, the dried honeycomb formed body was fired, to prepare a honeycomb fired body. The ambient temperature during the firing was set at 1350 to 1440° C. and a firing time was set to 10 hours.

Next, a wall material disposed in a circumferential portion of the honeycomb fired body was removed by grinding, and a circumference coating material was coated on the circumferential portion, to prepare a circumferential wall constituted of the circumference coating material. As the circumference coating material, there was used a ceramic slurry prepared by preparing cordierite particles having an average particle diameter of 20 to 50 μm and a 90% particle diameter of 150 μm or less as ceramic particles, and mixing the particles with colloidal silica, alumina fibers and water. As to a honeycomb filter obtained by forming the circumferential wall of the honeycomb filter by use of such a circumference coating material as described above, Table 1 shows "circumference processing" in column of "forming method of circumferential wall". On the other hand, for a honeycomb filter in which the circumferential portion of the honeycomb formed body obtained by the extrusion was used as the circumferential wall as it was, Table 1 shows "monolithic" in the column of "forming method of circumferential wall".

In the honeycomb filter of Example 1, a thickness of partition wall was 300 μm, and a cell density was 46.5 cells/cm². A cell shape in a cross section of the honeycomb filter which was perpendicular to an extending direction of cell was a quadrangle. Table 1 shows the thickness of the partition wall, the cell density, and the cell shape in column of "cell structure".

In the honeycomb filter of Example 1, a shape of a cross section perpendicular to an axial direction was a circle, and a honeycomb structure body had a cell row in which inflow cells 2a and outflow cells 2b were alternately arranged via partition wall 1 as shown in FIG. 3. Table 1 shows the shape of the honeycomb filter of Example 1 in columns of "cross-sectional shape", "diameter" and "total length".

As to the honeycomb filter of Example 1, "a porosity A of the partition wall in a partitioning region between the inflow cell and the outflow cell" and "a porosity B of the partition wall in an intersecting portion between two inflow cells" were measured by the following methods. Furthermore, an average porosity and a porosity ratio were obtained from values of the porosity A and the porosity B. The average porosity is a value of an arithmetic mean of the porosity A and the porosity B (i.e., (A+B)/2). The porosity ratio is a value of the porosity A to the porosity B (i.e., A/B). Table 2 shows the respective results.

[Measuring Method of Porosity]

First, a sample piece for which the porosity A and the porosity B were to be measured was cut out from the honeycomb filter. Respective regions from which the sample pieces were to be cut out were five regions on each of an inflow end face side and an outflow end face side of the honeycomb filter, i.e., ten regions in total. As regions to be cut out in each end face, there were considered a central position (a first region) of each end face, and four intermediate points (second to fifth regions) between the central position and a circumferential edge of the honeycomb filter on X-axis and Y-axis which passed this central position and were perpendicular to each other. The sample piece for which the porosity A was to be measured was cut out from each of the above-mentioned ten regions so as to include the partition wall of a central portion of the partition wall partitioning between the inflow cell and the outflow cell. A length of one side of the sample piece for which the porosity A was to be measured was considered as a thickness of the partition wall of the above-mentioned central portion, a length of another side thereof was adjusted to 100 μm in an extending direction of the partition walls in each end face, and a length of still another side thereof was adjusted to 20 mm in the extending direction of the cells. The sample piece for which the porosity B was to be measured was cut out from each of the above-mentioned ten regions so as to include a central portion of the intersecting portion of the partition walls. The sample piece for which the porosity B is to be measured is to be measured is considered as an end face of a square in which a length of one side is adjusted to 100 μm, taking the central portion of the intersecting portion of the partition walls as its center, and a length of the sample piece in an axial direction is adjusted to 20 mm in the extending direction of the cells. Next, the prepared sample piece was embedded in epoxy resin to harden, and then its surface was polished. Then, each sample piece was cut outside as much as 5 mm in a total length direction, and its cut surface was observed in a SEM to acquire an SEM image. As the scanning electron microscope, "model No. S3200-N" manufactured by Hitachi High-Technologies Corporation was used. During the measurement of the porosity A, the SEM image enlarged to 100 times was acquired as to the central portion of the partition wall in each observation surface of the ten sample pieces. Furthermore, during the measurement of the porosity B, the SEM image enlarged to 100 times was acquired as to the intersecting portion of the partition walls in each observation surface of the above-mentioned ten sample pieces. Afterward, as to each image, "an area S1 of the partition wall" and "an area S2 of a pore portion (a void portion)" were calculated by using image analysis software, and the porosity of the imaged partition wall of each image was calculated in accordance with "Formula (1): S2/(S1+S2)". As values of S1 and S2, average values of porosities of the respective ten regions were used.

TABLE 1

|  |  | Cell structure |  |  |  |  |  |  |  |  |
| --- | --- | --- | --- | --- | --- | --- | --- | --- | --- | --- |
|  | Material | Thickness of partition walls (μm) | Cell density (cells/cm$^2$) | Cell shape | Cross-sectional shape | Forming method of circumferential wall | Diameter (mm) | Long diameter (mm) | Short diameter (mm) | Total length (mm) |
| Example 1 | Cordierite | 300 | 46.5 | Quadrangle | Circle | Circumference processing | 266.7 | — | — | 304.8 |
| Example 2 | Cordierite | 300 | 46.5 | Quadrangle | Circle | Circumference processing | 266.7 | — | — | 304.8 |
| Example 3 | Cordierite | 305 | 46.5 | Quadrangle, octagon | Circle | Circumference processing | 266.7 | — | — | 254.0 |
| Example 4 | Cordierite | 305 | 46.5 | Quadrangle, octagon | Circle | Circumference processing | 266.7 | — | — | 254.0 |
| Example 5 | Cordierite | 410 | 31 | Quadrangle | Circle | Circumference processing | 228.6 | — | — | 200.0 |
| Example 6 | Cordierite | 410 | 31 | Quadrangle | Circle | Circumference processing | 228.6 | — | — | 200.0 |
| Example 7 | Cordierite | 355 | 31 | Quadrangle, octagon | Ellipse | Circumference processing | — | 228.6 | 137.2 | 152.4 |
| Example 8 | Cordierite | 355 | 31 | Quadrangle, octagon | Ellipse | Circumference processing | — | 228.6 | 137.2 | 152.4 |
| Example 9 | Cordierite | 300 | 46.5 | Hexagon | Circle | Circumference processing | 266.7 | — | — | 254.0 |
| Example 10 | Cordierite | 300 | 46.5 | Hexagon | Circle | Circumference processing | 266.7 | — | — | 254.0 |
| Example 11 | Cordierite | 303 | 46.5 | Quadrangle | Circle | Circumference processing | 355.6 | — | — | 304.8 |
| Example 12 | Cordierite | 303 | 46.5 | Quadrangle | Circle | Circumference processing | 355.6 | — | — | 304.8 |
| Example 13 | Cordierite | 230 | 46.5 | Quadrangle | Circle | Monolithic | 118.4 | — | — | 100.0 |
| Example 14 | Cordierite | 230 | 46.5 | Quadrangle | Circle | Monolithic | 118.4 | — | — | 100.0 |
| Example 15 | Cordierite | 405 | 46.5 | Quadrangle, octagon | Circle | Circumference processing | 143.8 | — | — | 152.4 |
| Example 16 | Cordierite | 405 | 46.5 | Quadrangle, octagon | Circle | Circumference processing | 143.8 | — | — | 152.4 |
| Example 17 | Cordierite | 355 | 46.5 | Quadrangle, octagon | Circle | Monolithic | 132.1 | — | — | 127.0 |
| Example 18 | Cordierite | 355 | 46.5 | Quadrangle, octagon | Circle | Monolithic | 132.1 | — | — | 127.0 |
| Example 19 | Cordierite | 301 | 46.5 | Quadrangle | Circle | Circumference processing | 304.8 | — | — | 355.6 |
| Example 20 | Cordierite | 301 | 46.5 | Quadrangle | Circle | Circumference processing | 304.8 | — | — | 355.6 |
| Example 21 | Cordierite | 255 | 46.5 | Quadrangle | Circle | Circumference processing | 190.5 | — | — | 200.0 |
| Example 22 | Cordierite | 255 | 46.5 | Quadrangle | Circle | Circumference processing | 190.5 | — | — | 200.0 |
| Example 23 | Cordierite | 203 | 31 | Quadrangle, octagon | Circle | Circumference processing | 190.5 | — | — | 150.0 |
| Example 24 | Cordierite | 203 | 31 | Quadrangle, octagon | Circle | Circumference processing | 190.5 | — | — | 150.0 |
| Example 25 | Cordierite | 178 | 46.5 | Quadrangle | Circle | Circumference processing | 280.0 | — | — | 254.0 |
| Example 26 | Cordierite | 178 | 46.5 | Quadrangle | Circle | Circumference processing | 280.0 | — | — | 254.0 |
| Example 27 | SiC | 305 | 46.5 | Quadrangle | Circle | Circumference processing | 228.6 | — | — | 152.4 |
| Example 28 | SiC | 305 | 46.5 | Quadrangle | Circle | Circumference processing | 228.6 | — | — | 152.4 |
| Example 29 | SiC | 254 | 46.5 | Quadrangle, octagon | Circle | Circumference processing | 172.0 | — | — | 200.0 |
| Example 30 | SiC | 254 | 46.5 | Quadrangle, octagon | Circle | Circumference processing | 172.0 | — | — | 200.0 |

TABLE 2

| | Porosity (%) | | | |
| --- | --- | --- | --- | --- |
| | Porosity A (partitioning region between inflow cell and outflow cell) | Porosity B (intersecting portion) | Average porosity [(A + B)/2] | Porosity ratio [A/B] |
| Example 1 | 46.6 | 50.2 | 48.4 | 0.93 |
| Example 2 | 63.0 | 67.0 | 65.0 | 0.94 |
| Example 3 | 40.5 | 52.5 | 46.5 | 0.77 |
| Example 4 | 54.5 | 68.0 | 61.3 | 0.80 |
| Example 5 | 42.2 | 51.2 | 46.7 | 0.82 |
| Example 6 | 56.5 | 68.5 | 62.5 | 0.82 |
| Example 7 | 30.4 | 51.9 | 41.2 | 0.59 |
| Example 8 | 45.5 | 72.0 | 58.8 | 0.63 |
| Example 9 | 25.7 | 51.4 | 38.6 | 0.50 |
| Example 10 | 41.0 | 63.3 | 52.2 | 0.65 |
| Example 11 | 47.7 | 52.6 | 50.2 | 0.91 |
| Example 12 | 56.1 | 60.1 | 58.1 | 0.93 |
| Example 13 | 39.1 | 51.5 | 45.3 | 0.76 |
| Example 14 | 53.0 | 69.5 | 61.3 | 0.76 |
| Example 15 | 25.6 | 37.1 | 31.4 | 0.69 |
| Example 16 | 50.5 | 69.8 | 60.2 | 0.72 |
| Example 17 | 29.9 | 37.9 | 33.9 | 0.79 |
| Example 18 | 56.0 | 68.1 | 62.1 | 0.82 |
| Example 19 | 34.1 | 37.9 | 36.0 | 0.90 |
| Example 20 | 45.0 | 49.5 | 47.3 | 0.91 |
| Example 21 | 25.3 | 40.5 | 32.9 | 0.62 |
| Example 22 | 43.5 | 66.0 | 54.8 | 0.66 |
| Example 23 | 19.3 | 33.5 | 26.4 | 0.58 |
| Example 24 | 38.5 | 63.5 | 51.0 | 0.61 |
| Example 25 | 22.0 | 33.4 | 27.7 | 0.66 |
| Example 26 | 48.8 | 68.5 | 58.7 | 0.71 |
| Example 27 | 35.5 | 47.1 | 41.3 | 0.75 |
| Example 28 | 48.9 | 69.8 | 59.4 | 0.70 |
| Example 29 | 39.8 | 51.0 | 45.4 | 0.78 |
| Example 30 | 50.5 | 64.6 | 57.6 | 0.78 |

Examples 2 to 30

A cell structure, a cross-sectional shape, a forming method of a circumferential wall and a porosity A and a porosity B of partition walls were changed as shown in Table 1 and Table 2, to prepare honeycomb filters of Examples 2 to 30. As to Examples 3, 4, 7, 8, 15 to 18, 23, 24, 29 and 30, a cell shape was formed as a shape shown in FIG. 5. Furthermore, in the above-mentioned examples, inflow cells were formed in an octagonal shape, and outflow cells were formed in a quadrangular shape. Additionally, as to Examples 7 and 8, a cross-sectional shape of the honeycomb filter was such an ellipse as shown in FIG. 10. In addition, as to Examples 13, 14, 17 and 18, any circumferential walls were not formed by using a circumference coating material, and a circumferential portion of a honeycomb formed body obtained by extrusion was used as the circumferential wall.

As to Examples 27 to 30, silicon carbide (SiC) was used as a material to prepare the honeycomb filter. The honeycomb filter of each of Examples 27 to 30 was a honeycomb filter of a segmented structure.

During preparation of the honeycomb filters of Examples 2 to 30, an extrusion pressure during extrusion was adjusted, and values of a porosity A and a porosity B of partition walls were adjusted.

As to the honeycomb filters of Examples 1 to 30, evaluations on "thermal shock resistance (robustness)" were performed by the following method. Table 3 shows the results.

[Thermal Shock Resistance (Robustness)]

As the evaluation of the thermal shock resistance, a test described hereinafter was conducted on the honeycomb filter, and the robustness of the honeycomb filter was evaluated by judging whether or not cracks were generated in the tested honeycomb filter. Specifically, soot was first deposited in the honeycomb filter of each of the examples and comparative examples at a rate of 2 to 12 g/L. The soot was deposited in an engine bench on which a 2.2 L diesel engine was mounted. As to operation conditions of the engine bench, an engine revolution number was adjusted to 2000 rpm, and an engine torque was adjusted to 60 Nm. Afterward, a regeneration treatment was performed by a post injection, and an inlet gas temperature of the honeycomb filter was raised. When a pressure loss before and after the honeycomb filter started to drop, the post injection was cut off, and the engine was switched to an idle state. At this time, in each example, the highest temperature in a central portion of the outflow end face was adjusted at 1000° C., and the tests were conducted under conditions where the amount of the soot to be deposited was the same in the example and the comparative example which were denoted with the same number. Then, each of "the partition wall of the partitioning region between the inflow cell and the outflow cell" and "the intersecting portion" of each honeycomb filter was visually observed to confirm whether or not the cracks were present. When the presence/absence of the cracks was confirmed, all regions of the outflow end face having the highest temperature were observed in the above-mentioned test. The thermal shock resistance was then evaluated on the basis of the following evaluation standards. Table 3 shows the results.

Evaluation A: any cracks were not confirmed.
Evaluation B: cracks were present in one region.
Evaluation C: cracks were present continuously in two or more regions.

Furthermore, in the evaluation of the thermal shock resistance, a comprehensive judgment was performed based on the evaluation results in the above two regions by the following method. Table 3 shows the results. It is to be noted that in this comprehensive judgment, Evaluation A is considered as passing and Evaluation B and Evaluation C are considered as failures.

Evaluation A; any soot did not leak, and cracks were present in one or less region were present.

Evaluation B: any soot did not leak, but cracks were present continuously in two or more regions.

Evaluation C: the soot leaked.

TABLE 3

| | Thermal shock resistance (robustness) | | |
|---|---|---|---|
| | Partition wall of partitioning region between inflow cell and outflow cell | Intersecting portion | Comprehensive judgment |
| Example 1 | A | B | A |
| Example 2 | A | B | A |
| Example 3 | A | B | A |
| Example 4 | A | B | A |
| Example 5 | A | B | A |
| Example 6 | A | B | A |
| Example 7 | A | B | A |
| Example 8 | A | B | A |
| Example 9 | A | B | A |
| Example 10 | A | B | A |
| Example 11 | A | B | A |
| Example 12 | A | B | A |
| Example 13 | A | B | A |
| Example 14 | A | B | A |
| Example 15 | A | B | A |
| Example 16 | A | B | A |
| Example 17 | A | B | A |
| Example 18 | A | B | A |
| Example 19 | A | B | A |
| Example 20 | A | B | A |
| Example 21 | A | B | A |
| Example 22 | A | B | A |
| Example 23 | A | B | A |
| Example 24 | A | B | A |
| Example 25 | A | B | A |
| Example 26 | A | B | A |
| Example 27 | A | B | A |

TABLE 3-continued

| | Thermal shock resistance (robustness) | | |
|---|---|---|---|
| | Partition wall of partitioning region between inflow cell and outflow cell | Intersecting portion | Comprehensive judgment |
| Example 28 | A | B | A |
| Example 29 | A | B | A |
| Example 30 | A | B | A |

Comparative Examples 1 to 30

A cell structure, a cross-sectional shape, a forming method of a circumferential wall and a porosity A and a porosity B of partition walls were changed as shown in Table 4 and Table 5, to prepare honeycomb filters of Comparative Examples 1 to 30. Also as to the honeycomb filters of Comparative Examples 1 to 30, the procedure of Example 1 was repeated to evaluate "thermal shock resistance (robustness)". Table 6 shows the results.

As to Comparative Examples 3, 4, 7, 8, 15 to 18, 23, 24, 29, and 30, cells were formed in such a shape as shown in FIG. 5. Furthermore, as to Comparative Examples 7 and 8, a cross-sectional shape of the honeycomb filter was such an ellipse as shown in FIG. 10. Additionally, as to Comparative Examples 13, 14, 17 and 18, any circumferential walls were not formed by using a circumference coating material, and a circumferential portion of a honeycomb formed body obtained by extrusion was used as the circumferential wall. As to Comparative Examples 27 to 30, silicon carbide (SiC) was used as a material to prepare the honeycomb filter. The honeycomb filter of each of Comparative Examples 27 to 30 was a honeycomb filter of a segmented structure. In addition, the honeycomb filters of Comparative Examples 1 to 30 had the same structure as in the honeycomb filters of Examples 1 to 30 having the corresponding numbers, except that values of the porosity A and the porosity B were different.

TABLE 4

| | | Cell structure | | | | | | | |
|---|---|---|---|---|---|---|---|---|---|
| | Material | Thickness of partition walls (μm) | Cell density (cells/cm$^2$) | Cell shape | Cross-sectional shape | Forming method of circumferential wall | Diameter (mm) | Long diameter (mm) | Short diameter (mm) | Total length (mm) |
| Comparative Example 1 | Cordierite | 300 | 46.5 | Quadrangle | Circle | Circumference processing | 266.7 | — | — | 304.8 |
| Comparative Example 2 | Cordierite | 300 | 46.5 | Quadrangle | Circle | Circumference processing | 266.7 | — | — | 304.8 |
| Comparative Example 3 | Cordierite | 305 | 46.5 | Quadrangle, octagon | Circle | Circumference processing | 266.7 | — | — | 254.0 |
| Comparative Example 4 | Cordierite | 305 | 46.5 | Quadrangle, octagon | Circle | Circumference processing | 266.7 | — | — | 254.0 |
| Comparative Example 5 | Cordierite | 410 | 31 | Quadrangle | Circle | Circumference processing | 228.6 | — | — | 200.0 |
| Comparative Example 6 | Cordierite | 410 | 31 | Quadrangle | Circle | Circumference processing | 228.6 | — | — | 200.0 |
| Comparative Example 7 | Cordierite | 355 | 31 | Quadrangle, octagon | Ellipse | Circumference processing | — | 228.6 | 137.2 | 152.4 |
| Comparative Example 8 | Cordierite | 355 | 31 | Quadrangle, octagon | Ellipse | Circumference processing | — | 228.6 | 137.2 | 152.4 |
| Comparative Example 9 | Cordierite | 300 | 46.5 | Hexagon | Circle | Circumference processing | 266.7 | — | — | 254.0 |
| Comparative Example 10 | Cordierite | 300 | 46.5 | Hexagon | Circle | Circumference processing | 266.7 | — | — | 254.0 |
| Comparative Example 11 | Cordierite | 303 | 46.5 | Quadrangle | Circle | Circumference processing | 355.6 | — | — | 304.8 |

TABLE 4-continued

| | | Cell structure | | | | | | | | |
|---|---|---|---|---|---|---|---|---|---|---|
| | Material | Thickness of partition walls (μm) | Cell density (cells/cm$^2$) | Cell shape | Cross-sectional shape | Forming method of circumferential wall | Diameter (mm) | Long diameter (mm) | Short diameter (mm) | Total length (mm) |
| Comparative Example12 | Cordierite | 303 | 46.5 | Quadrangle | Circle | Circumference processing | 355.6 | — | — | 304.8 |
| Comparative Example13 | Cordierite | 230 | 46.5 | Quadrangle | Circle | Monolithic | 118.4 | — | — | 100.0 |
| Comparative Example14 | Cordierite | 230 | 46.5 | Quadrangle | Circle | Monolithic | 118.4 | — | — | 100.0 |
| Comparative Example15 | Cordierite | 405 | 46.5 | Quadrangle, octagon | Circle | Circumference processing | 143.8 | — | — | 152.4 |
| Comparative Example16 | Cordierite | 405 | 46.5 | Quadrangle, octagon | Circle | Circumference processing | 143.8 | — | — | 152.4 |
| Comparative Example17 | Cordierite | 355 | 46.5 | Quadrangle, octagon | Circle | Monolithic | 132.1 | — | — | 127.0 |
| Comparative Example18 | Cordierite | 355 | 46.5 | Quadrangle, octagon | Circle | Monolithic | 132.1 | — | — | 127.0 |
| Comparative Example19 | Cordierite | 301 | 46.5 | Quadrangle | Circle | Circumference processing | 304.8 | — | — | 355.6 |
| Comparative Example20 | Cordierite | 301 | 46.5 | Quadrangle | Circle | Circumference processing | 304.8 | — | — | 355.6 |
| Comparative Example21 | Cordierite | 255 | 46.5 | Quadrangle | Circle | Circumference processing | 190.5 | — | — | 200.0 |
| Comparative Example22 | Cordierite | 255 | 46.5 | Quadrangle | Circle | Circumference processing | 190.5 | — | — | 200.0 |
| Comparative Example23 | Cordierite | 203 | 31 | Quadrangle, octagon | Circle | Circumference processing | 190.5 | — | — | 150.0 |
| Comparative Example24 | Cordierite | 203 | 31 | Quadrangle, octagon | Circle | Circumference processing | 190.5 | — | — | 150.0 |
| Comparative Example25 | Cordierite | 178 | 46.5 | Quadrangle | Circle | Circumference processing | 280.0 | — | — | 254.0 |
| Comparative Example26 | Cordierite | 178 | 46.5 | Quadrangle | Circle | Circumference processing | 280.0 | — | — | 254.0 |
| Comparative Example27 | SiC | 305 | 46.5 | Quadrangle | Circle | Circumference processing | 228.6 | — | — | 152.4 |
| Comparative Example28 | SiC | 305 | 46.5 | Quadrangle | Circle | Circumference processing | 228.6 | — | — | 152.4 |
| Comparative Example29 | SiC | 254 | 46.5 | Quadrangle, octagon | Circle | Circumference processing | 172.0 | — | — | 200.0 |
| Comparative Example30 | SiC | 254 | 46.5 | Quadrangle, octagon | Circle | Circumference processing | 172.0 | — | — | 200.0 |

TABLE 5

| | Porosity (%) | | | Porosity ratio (intermediate portion/ intersecting portion) |
|---|---|---|---|---|
| | Porosity A (partitioning region between inflow cell and outflow cell) | Porosity B (intersecting portion) | Average porosity (A + B)/2 | |
| Comparative Example 1 | 47.8 | 49.2 | 48.5 | 0.97 |
| Comparative Example 2 | 64.5 | 65.2 | 64.9 | 0.99 |
| Comparative Example 3 | 45.8 | 47.0 | 46.4 | 0.97 |
| Comparative Example 4 | 60.3 | 62.4 | 61.4 | 0.97 |
| Comparative Example 5 | 49.0 | 44.5 | 46.8 | 1.10 |
| Comparative Example 6 | 64.8 | 60.6 | 62.7 | 1.07 |
| Comparative Example 7 | 44.7 | 38.1 | 41.4 | 1.17 |
| Comparative Example 8 | 62.5 | 55.3 | 58.9 | 1.13 |
| Comparative Example 9 | 22.0 | 55.8 | 38.9 | 0.39 |
| Comparative Example10 | 30.5 | 73.5 | 52.0 | 0.41 |
| Comparative Example11 | 30.3 | 69.7 | 50.0 | 0.43 |
| Comparative Example12 | 36.3 | 79.5 | 57.9 | 0.46 |
| Comparative Example13 | 45.0 | 45.7 | 45.4 | 0.98 |
| Comparative Example14 | 61.0 | 61.5 | 61.3 | 0.99 |
| Comparative Example15 | 31.2 | 32.2 | 31.7 | 0.97 |
| Comparative Example16 | 59.9 | 60.4 | 60.2 | 0.99 |
| Comparative Example17 | 34.6 | 33.4 | 34.0 | 1.04 |
| Comparative Example18 | 62.8 | 61.8 | 62.3 | 1.02 |
| Comparative Example19 | 18.2 | 54.1 | 36.2 | 0.34 |
| Comparative Example20 | 23.0 | 71.1 | 47.1 | 0.32 |

TABLE 5-continued

| | Porosity (%) | | | Porosity ratio (intermediate portion/ intersecting portion) |
|---|---|---|---|---|
| | Porosity A (partitioning region between inflow cell and outflow cell) | Porosity B (intersecting portion) | Average porosity (A + B)/2 | |
| Comparative Example21 | 32.9 | 33.5 | 33.2 | 0.98 |
| Comparative Example22 | 53.5 | 56.0 | 54.8 | 0.96 |
| Comparative Example23 | 14.3 | 38.5 | 26.4 | 0.37 |
| Comparative Example24 | 32.0 | 69.5 | 50.8 | 0.46 |
| Comparative Example25 | 27.9 | 27.4 | 27.7 | 1.02 |
| Comparative Example26 | 59.0 | 58.5 | 58.8 | 1.01 |
| Comparative Example27 | 40.9 | 41.5 | 41.2 | 0.99 |
| Comparative Example28 | 58.5 | 60.3 | 59.4 | 0.97 |
| Comparative Example29 | 28.5 | 62.4 | 45.5 | 0.46 |
| Comparative Example30 | 35.8 | 79.8 | 57.8 | 0.45 |

TABLE 6

| | Thermal shock resistance (robustness) | | |
|---|---|---|---|
| | Partition wall of partitioning region between inflow cell and outflow cell | Intersecting portion | Comprehensive judgment |
| Comparative Example 1 | B | A | C |
| Comparative Example 2 | B | A | C |
| Comparative Example 3 | B | A | C |
| Comparative Example 4 | B | A | C |
| Comparative Example 5 | B | A | C |
| Comparative Example 6 | B | A | C |
| Comparative Example 7 | B | A | C |
| Comparative Example 8 | B | A | C |
| Comparative Example 9 | A | C | B |
| Comparative Example 10 | A | C | B |
| Comparative Example 11 | A | C | B |
| Comparative Example 12 | A | C | B |
| Comparative Example 13 | B | A | C |
| Comparative Example 14 | B | A | C |
| Comparative Example 15 | B | A | C |
| Comparative Example 16 | B | A | C |
| Comparative Example 17 | B | A | C |
| Comparative Example 18 | B | A | C |
| Comparative Example 19 | A | C | B |
| Comparative Example 20 | A | C | B |
| Comparative Example 21 | B | A | C |
| Comparative Example 22 | B | A | C |
| Comparative Example 23 | A | C | B |
| Comparative Example 24 | A | C | B |
| Comparative Example 25 | B | A | C |
| Comparative Example 26 | B | A | C |
| Comparative Example 27 | B | A | C |
| Comparative Example 28 | B | A | C |
| Comparative Example 29 | A | C | B |
| Comparative Example 30 | A | C | B |

(Result)

The honeycomb filters of Examples 1 to 30 could obtain the result of "Evaluation A" which satisfied criteria for passing in the comprehensive judgment of the thermal shock resistance. In particular, in the honeycomb filters of Examples 1 to 30, any cracks were not confirmed in "the partitioning region between the inflow cell and the outflow cell (i.e., a substantial wall portion of the partition wall)". Additionally, as to "the intersecting portion between the inflow cells", cracks were confirmed in one region, but the honeycomb filter was not affected by the cracks to such an extent that soot leaked. Therefore, it can be considered that even if these cracks are generated, a performance of the honeycomb filter is not affected. In consequence, the honeycomb filters of Examples 1 to 30 were capable of effectively inhibiting particulate matter such as soot from leaking outside.

The honeycomb filters of Comparative Examples 1 to 30 had the result of "Evaluation B" or "Evaluation C" indicating failure in the comprehensive judgment of the thermal shock resistance. In particular, as to the honeycomb filter in which the cracks were confirmed in "the partitioning region between the inflow cell and the outflow cell", it was confirmed that the soot leaked out from the honeycomb filter. Furthermore, the honeycomb filter in which the cracks were confirmed continuously in two or more regions in "the intersecting portion" was unfavorable in that its structural mechanical strength deteriorated.

A honeycomb filter of the present invention is utilizable as a filter to trap particulate matter in an exhaust gas.

DESCRIPTION OF REFERENCE NUMERALS

1, 21, 41, 61 and 81: partition wall, 2, 22, 42, 62 and 82: cell, 2a, 22a, 42a, 62a and 82a: inflow cell, 2b, 22b, 42b, 62b and 82b: outflow cell, 3 and 83: circumferential wall, 4, 24, 44, 64 and 84: honeycomb structure body, 5, 25, 45, 65 and 85: plugging portion, 11, 31, 51, 71 and 91: inflow end face, 12 and 92: outflow end face, 15, 35, 55 and 75: intersecting portion between inflow cells, 16, 36, 56 and 76: partitioning region between inflow cell and outflow cell, 86:

honeycomb segment, 87: bonding layer, and 100, 200, 300, 400, 500 and 600: honeycomb filter.

What is claimed is:

1. A honeycomb filter comprising:

a honeycomb structure body having porous partition walls arranged to surround a plurality of cells extending from an inflow end face to an outflow end face to form through channels for a fluid, and a plugging portion disposed to plug either one of end portions of each of the cells on the side of the inflow end face or the side of the outflow end face, wherein the cells in which the plugging portions are arranged in end portions on the outflow end face side and which are opened on the inflow end face side are defined as inflow cells, the cells in which the plugging portions are arranged in end portions on the inflow end face side and which are opened on the outflow end face side are defined as outflow cells, in a cross section of the honeycomb structure body which is perpendicular to an extending direction of the cells, the honeycomb structure body includes at least a cell row in which the inflow cells and the outflow cells are alternately arranged via the partition walls in one direction, a value of a porosity of the partition wall in a partitioning region between the inflow cell and the outflow cell is defined as a porosity A, among intersecting portions where partitioning regions of the partition walls between the cells intersect one another, a value of a porosity of the partition wall in an intersecting portion between the two inflow cells is defined as a porosity B, and a value of A/B obtained by dividing the porosity A by the porosity B is from 0.50 to 0.95.

2. The honeycomb filter according to claim 1, wherein the porosity A is from 15 to 70%.

3. The honeycomb filter according to claim 1, wherein an arithmetic mean of the porosity A and the porosity B is from 25 to 80%.

4. The honeycomb filter according to claim 1, wherein a shape of the inflow cells in the cross section of the honeycomb structure body which is perpendicular to the extending direction of the cells is quadrangular, hexagonal or octagonal.

5. The honeycomb filter according to claim 4, wherein a shape of the outflow cells in the cross section of the honeycomb structure body which is perpendicular to the extending direction of the cells is quadrangular or hexagonal.

6. The honeycomb filter according to claim 1, wherein an open end area S1 of one of the inflow cells is larger than an open end area S2 of one of the outflow cells.

7. The honeycomb filter according to claim 1, wherein a thickness of the partition walls is from 100 to 450 µm.

* * * * *